(12) United States Patent
Morris (10) Patent No.: US 6,873,629 B2
(45) Date of Patent: Mar. 29, 2005

(54) METHOD AND APPARATUS FOR CONVERTING DATA STREAMS

(75) Inventor: Octavius J. Morris, Red Hill (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 1001 days.

(21) Appl. No.: 09/741,977

(22) Filed: Dec. 20, 2000

(65) Prior Publication Data

US 2001/0009548 A1 Jul. 26, 2001

(30) Foreign Application Priority Data

Dec. 30, 1999 (GB) ............................................. 9930788

(51) Int. Cl.[7] ................................................ H04J 3/04
(52) U.S. Cl. ......................... 370/535; 386/98; 725/139
(58) Field of Search ................................ 370/486, 487, 370/535–545

(56) References Cited

U.S. PATENT DOCUMENTS

| | | | | |
|---|---|---|---|---|
| 6,014,368 A | * | 1/2000 | Sanami | 370/242 |
| 6,172,988 B1 | * | 1/2001 | Tiernan et al. | 370/473 |
| 6,211,800 B1 | * | 4/2001 | Yanagihara et al. | 341/50 |
| 6,275,507 B1 | * | 8/2001 | Anderson et al. | 370/487 |
| 6,504,996 B1 | * | 1/2003 | Na et al. | 386/125 |
| 6,567,409 B1 | * | 5/2003 | Tozaki et al. | 370/395.64 |
| 2004/0136696 A1 | * | 7/2004 | Shiokawa et al. | 386/98 |

FOREIGN PATENT DOCUMENTS

| | | | | |
|---|---|---|---|---|
| EP | 0833514 A2 | 4/1998 | | H04N/7/24 |
| GB | 0847198 A1 | 6/1998 | | H04N/5/92 |
| GB | 0926903 A1 | 6/1999 | | H04N/9/804 |
| JP | 10243394 A | 9/1998 | | H04N/7/24 |
| WO | WO9920045 | 4/1999 | | H04N/5/783 |

* cited by examiner

*Primary Examiner*—Frank Duong
*Assistant Examiner*—Michael J. Moore, Jr.
(74) *Attorney, Agent, or Firm*—Michael E. Belk (57) ABSTRACT

A digital video recorder or similar apparatus implements a method of converting an input data stream having an MPEG-2 Transport Stream (TS) format into an output data stream having an MPEG-2 Program Stream (PS) format. The input data stream (TS) includes data of at least first and second elementary data streams (404, 406) formed and multiplexed in compliance with a TS decoder model. The first elementary stream is a video stream, while the second stream is an audio stream of lower data rate. The input stream is parsed (402) and the elementary streams are demultiplexed into respective FIFO queues 404/406. Each stream is further parsed to obtain and calculate time stamp information which is queued separately at (408/410) with pointers to the stream data (at 404/406). The schedule and packetisation applied to the elementary streams in the input stream (TS) cannot be applied directly in creating the output stream (PS). However, based on parameters and constraints imposed upon the input stream by the MPEG or other specifications, a remultiplexer 412 is able to reschedule and repacketise the elementary data streams into a valid output stream (TS), without the size of buffer that would be required for multiplexing of the elementary streams from scratch.

20 Claims, 3 Drawing Sheets

METHOD AND APPARATUS FOR CONVERTING DATA STREAMS

The invention relates to methods and apparatuses for converting multiplexed data streams from one multiplexed format to another (transmultiplexing). The invention finds particular application for example in transmultiplexing video and audio streams from a transport stream format to a program stream format in compliance with the MPEG-2 specification (ITU-T Recommendation H.222.0 | ISO/IEC 13818-1).

The MPEG-2 Standard mentioned above specifies generic methods for multimedia multiplexing, synchronisation and timebase recovery. The specifications provide a packet based multimedia multiplexing where each elementary bit stream (video, audio, other data) is segmented into a Packetised Elementary Stream (PES), and then respective packets are multiplexed into either of two distinct stream types. Program Stream (PS) is a multiplex of variable length PES packets and designed for use in error free environments, such as recording on disc. Transport Stream (TS) consists of 188 byte fixed length packets, has functionality of multiple programme multiplexing as well as multiplexing of various PES packets of one programme, and is designed for use in error prone environments such as broadcast. The multimedia synchronisation and timebase recovery are achieved by the use of time-stamps for system time clock and presentation/decoding.

Because each type of stream has its advantages and disadvantages in different circumstances, the MPEG-2 specification recognises that conversion between the two formats may be desirable. However, due to differences between the formats and particularly the "target decoder" models which define constraints as to buffer sizes, time delays, data rates and so forth, the different elementary streams cannot be scheduled in one format the same as they were in the other. It is necessary therefore to demultiplex and remultiplex the elementary stream data when converting from one type of stream to the other. There is also the factor that system information which puts a structure into PS data designed for random access, editing and the like, is generally absent from the TS broadcast.

EP-A-0 833 514 (Sony) proposes a system of recorder/player apparatus and presentation (display) apparatus. The player, for example, reads PS format data from a disc and converts it to TS format for the display. On the other hand, the buffer sizes present in the embodiments thereof do not appear to account for the different constraints which require rescheduling of the different elementary streams to convert a valid PS to a valid TS format. In fact, it can be shown that the constraints imposed by the TS specification itself require a buffer for at least one second's worth of video information, and the same processing effort as would be required to make the stream from scratch. Conversion from TS to PS format is not discussed in EP '514.

It is an object of the invention to reduce the computational burden and/or the storage space required, when converting data streams between formats such as the MPEG transport stream and program stream. It will be understood that the invention is applicable beyond the strict confines of MPEG-2 compliant streams, as similar problems will generally arise when converting multiplexed streams between any two formats.

The inventors have recognised that, although re-scheduling is inevitable to convert from one format to the other, constraints inherent in the source format can be exploited to reduce the size of buffering, and/or the amount of processing required in the conversion.

The invention provides a method of converting a data stream received in a specified Transport Stream (TS) format into an output data stream in a specified Program Stream (PS) format, the TS format being one in which at least first and second packetised elementary streams of encoded information relating to a desired programme have been further packetised into TS packets and multiplexed together with further streams relating to different programmes, the PS format being one in which the first and second elementary stream and optionally others relating generally to a selected programme are packetised and their packets interleaved to form a multiplexed stream of PS packs, each PS pack including a pack header and one or more whole packets of the packetised elementary streams, wherein said method comprises:

(a) extracting from the received data stream program mapping information identifying a current stream index for each of the first and second elementary streams;
(b) filtering data of the received data stream to extract packets carrying the desired elementary streams;
(c) parsing the first and second elementary streams in accordance with packet header information to identify a sequence of presentation units within the payload of each desired elementary stream;
(d) writing the presentation units of each stream in sequence into first and second payload queues respectively prior to re-multiplexing;
(e) determining, in accordance with a synchronous relationship between the elementary streams and with a PS target decoder model and PS stream constraints, a valid PS schedule for re-multiplexing payload data from the first and second payload queues into a series of PS packs; and
(f) in accordance with the determined PS schedule, retrieving said payload data from each queue, inserting packet headers so as to re-packetise each elementary stream, generating PS pack headers and multiplexing the packets of the first and second elementary streams into a series of PS packs so as to generate said output signal;

wherein the PS schedule determined in step (e) is dependent on the scheduling of presentation units within the received TS format signal.

The method may provide the further steps of:

(g) extracting from the received data stream timing references associated with specific points in the packetised elementary streams and calculating a time stamp value for each presentation unit in each elementary stream, including interpolated time stamp values for those presentation units not accompanied by a timing reference in the received TS format data stream; and
(h) writing the time stamp values into first and second time stamp queues so as to correspond with the respective presentation units entered in the first and second payload queues; and
(i) retrieving each time stamp value from the queue when retrieving the corresponding payload data.

The invention may also provide a method wherein a presentation timing reference value is included in the PS pack for any new presentation unit starting within the pack, said presentation timing being obtained by calculation from TS delivery timing and presentation timing reference fields accompanying certain presentation units within the received data stream, and by interpolation for presentation units not accompanied by a delivery timing reference in the received TS format data stream.

In the specific embodiments disclosed herein the data rate of the first elementary stream is substantially greater than that of the second elementary stream.

In a particular embodiment of the invention in step (e) the payload data from plural TS packets of the first elementary stream is generally accumulated to fill substantially a complete PS pack before scheduling any of said data in the PS schedule.

In addition in said embodiment in step (e) the payload data corresponding to one complete presentation unit of the second elementary stream may be scheduled without waiting for data of the elementary stream to fill substantially a complete PS pack.

In yet another embodiment of the invention in step (e) the data of the first elementary stream may be delayed in the first payload queue by a delay at least equal to a minimum time required to receive one complete presentation unit of the second elementary stream, while a presentation unit of the second elementary stream may be scheduled immediately it is completely received.

In embodiments of the invention different presentation unit data sizes and/or different data delivery rates are valid within the TS format for the second elementary stream, while and the minimum time is fixed at least equal to the time required to receive one complete presentation unit of the largest size at the lowest rate.

In one embodiment of the invention the PS format specifies a minimum buffer size for holding the first elementary stream payload in a compatible decoder during decoding, while the first payload queue has a maximum capacity less than one tenth the minimum buffer size.

The PS format may further specify a minimum buffer size for holding the first elementary stream payload in a compatible decoder during decoding, while the first payload queue has a maximum capacity less than one twentieth said minimum buffer size.

The first payload queue may have a maximum capacity between one and a half (1.5) and four (4) times the size of each PS pack.

The entry in the time stamp queue may record for the corresponding presentation unit a TS format delivery time of the presentation unit within the received data stream and a presentation time for the presentation unit after decoding, and wherein the PS pack containing the same presentation unit includes an indication of a PS format delivery time for the pack and an indication of presentation time for at least one presentation unit within the PS pack.

In one embodiment of the invention the timing reference values included in the PS format output data stream are calculated with reference to a single time base irrespective of changes in time base throughout the received TS format data stream.

In particular embodiments of the invention the PS packs and elementary stream packets are generated so as to align the start of a new presentation unit preferentially with the start of a PS pack irrespective of misalignment between corresponding features in the received TS format data stream.

In particular embodiments of the invention said PS format data stream is generated so as to employ a fixed program mapping irrespective of changes in program mapping signalled and followed in the TS format stream.

In the disclosed embodiments of the invention, presentation units of the first elementary stream comprise encoded video pictures and the presentation units of the second elementary stream comprise encoded audio frames.

The invention further provides a method of converting a data stream received in a specified Transport Stream (TS) format into an output data stream in a specified Program Stream (PS) format, wherein said TS format is compliant with the MPEG-2 Transport Stream specification, while said PS format is compliant with the MPEG-2 Program Stream specification, both as defined in ITU-T Recommendation H.222.0 and ISO/IEC 13818-1.

The invention further provides a method of recording an audio-visual programme wherein a programme to be recorded is selected from among a plurality of programmes conveyed in a transport stream (TS) format, converted to a program stream (PS) format by a method as described above, and then recorded on a recording medium for subsequent retrieval and decoding.

The invention further provides apparatus comprising means specifically adapted for implementing any of the methods according to the invention set forth above. Such apparatus may for example form part of a stand-alone decoder apparatus (set-top box), a presentation apparatus (such as a TV set) or a recording and reproducing apparatus (digital VCR).

Other features and advantages of the invention beyond those identified above and many variations and modifications of the same invention will become clear to the skilled reader from a consideration of the following description of specific embodiments.

BRIEF DESCRIPTION OF THE DRAWINGS

Embodiments of the invention will now be described, by way of example only, by reference to the accompanying drawings, in which.

DETAILED DESCRIPTION OF THE EMBODIMENTS

Example System

Figure 1:
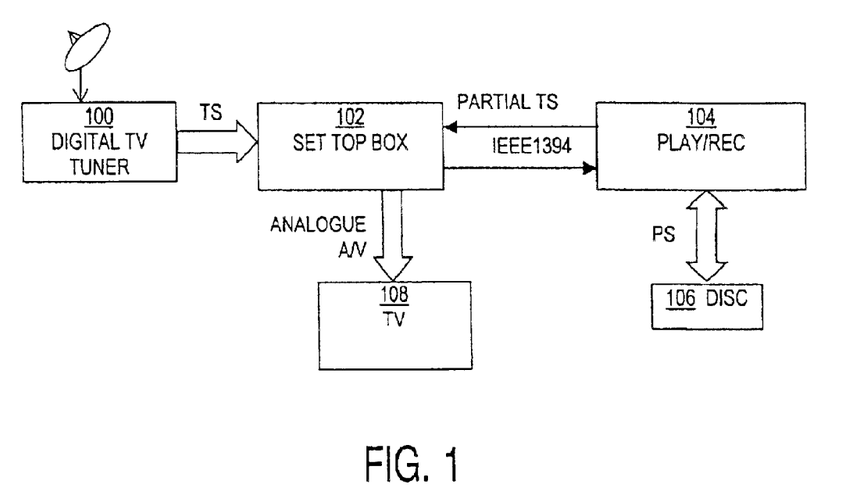
FIG. 1 illustrates an example digital video entertainment system in which an embodiment of the invention is applied.

FIG. 1 illustrates an example home digital video entertainment system, including a digital TV tuner 100, a "set top box" 102 for decoding digital video signals, controlling access to pay channels and so forth, a digital video playback and recording device 104 such as a well-known optical disc video system or future DVR recorder, and the storage medium itself (disc 106). In this example, a conventional analogue TV set 108 is used in this configuration for displaying pictures from a satellite, cable or terrestrial broadcast, or from a recording on disc 106. Between the digital tuner 100 and the set top box 102, MPEG-compatible transport stream (TS) format signals carry a number of digital TV channels, some of which may be scrambled for decoding with special conditional access (pay TV) arrangements. The standard digital broadcast formats, for example DVB, ATSC and ARIB, are specific applications within the MPEG-2 transport stream format.

Set top box 102 also decodes a desired programme from within the transport stream TS, to provide analogue audio and video signals to the TV set 108. These analogue signals can of course be recorded by a conventional video recorder (VCR). On the other hand, for maximum quality and functionality, the direct digital-to-digital recorder such as well-known optical disc video system or DVR recorder 104 is preferred. This is connected to the set top box via a digital interface such as IEEE1394 ("Firewire"). This carries a "partial TS" in which the selected programme is separated from the larger TS multiplex, and presented still within the TS format. On the other hand, to take advantage of the improved directory structure and random-access features, the player/recorder 104 is arranged to convert the TS format into PS format for recording on the disc 106, and to convert PS format streams recorded on disc 106 into partial TS format for playback, via the digital interface and set top box 102, on the TV 108.

The present description relates primarily to the process of conversion from Transport Stream (TS) format to Program Stream (PS) format, while conversion in the other direction is the subject of our co-pending application entitled "Method and Apparatus for Converting Data Streams" and claiming priority from United Kingdom patent application no. 9930787.8 filed 30$^{th}$ Dec. 1999 [PHB 34445]. Before examining in detail the techniques applied for efficient conversion between these formats, the two formats will be described in more detail with reference to FIGS. 2 and 3.

Transport Stream (TS) Format

Figure 2:
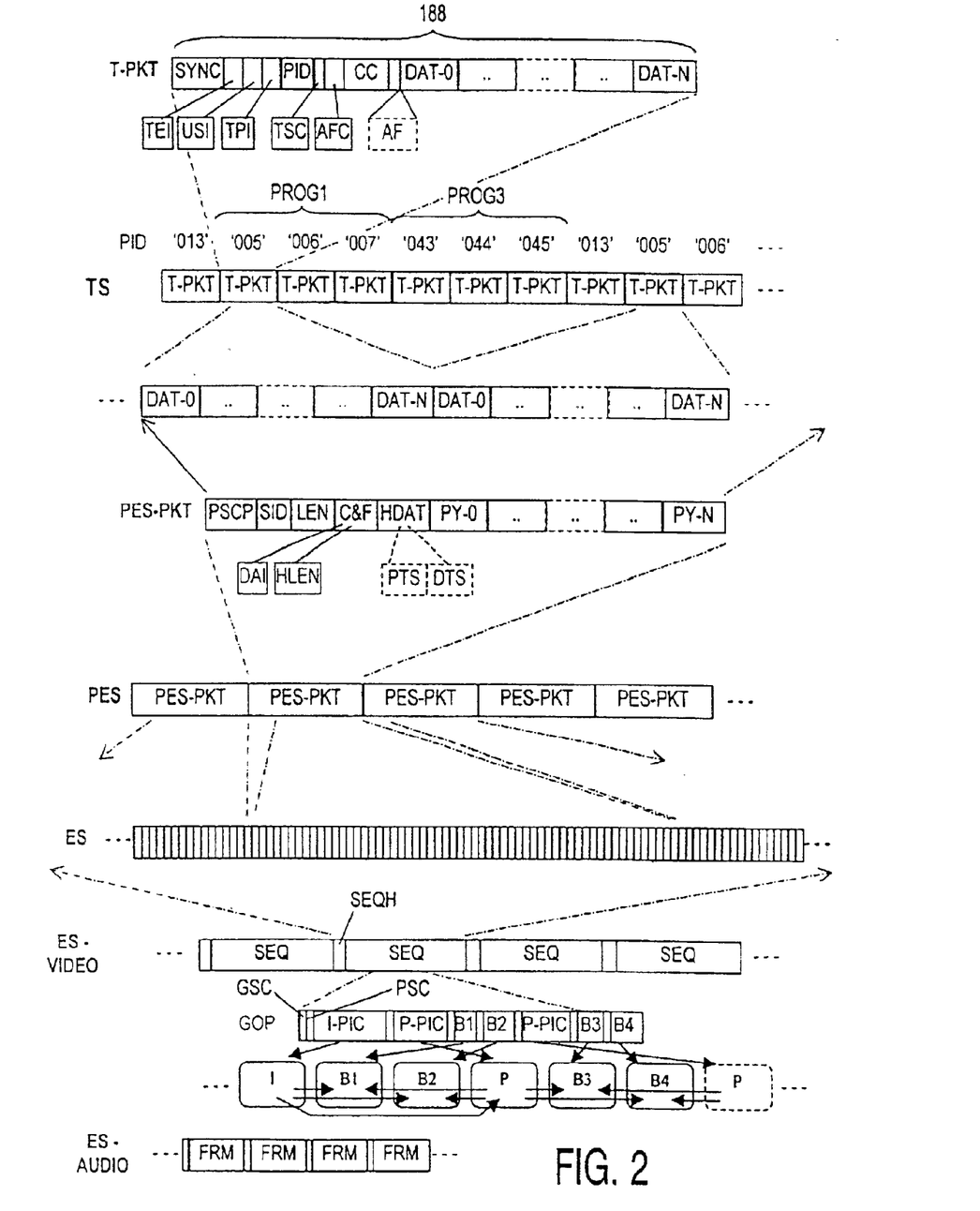
FIG. 2 illustrates the format of data in a transport stream (TS) format.

FIG. 2 illustrates the key features and structure of the MPEG-2 Transport Stream (TS) format. The Transport Stream TS is a continuous stream of transport packets labelled T-PKT in the drawing, each comprising 188 bytes of data, and having the format shown at the top of the figure. Full details of the MPEG-2 Transport Stream, including Syntax, semantics and constraints applicable, will be found in ITU-T recommendation H.262 | ISO/IEC 13818-2. Briefly, each transport packet includes a header portion and a payload portion, the payload being indicated as bytes DAT-0 to DAT-N in the figure. The header begins with a distinctive synchronisation byte SYNC followed by various flags and control fields including a transport error indicator TEI, a payload unit start indicator USI, a transport priority indicator TPI, a packet identification PID, transport scrambling control field TSC, adaptation field control AFC and continuity counter CC. Depending on the contents of field AFC, there may be present an adaptation field AF, occupying some of the space otherwise allocated to payload data.

In the example of the DVB digital broadcast format, the data rate of the TS Stream is around 40 (Mbits/s), while the typical data rate for an audio visual programme is less than 10 Mbits/s. Accordingly, as shown at TS in FIG. 2, various programmes PROG1, PROG3 can be multiplexed into a single transport stream. The field PID of each transport packet indicates one elementary stream to which that packet relates, these being interleaved in units of transport packets with plentiful other streams. One programme may for example comprise of a video stream (PID='005' in the example), an audio stream (PID='006') and teletext data stream (PID='007'). The correspondence between PID values and programmes, and the type of data carried with each PID is maintained in the form of programme specific information (PSI) tables. Periodically within the transport stream a programme association table PAT is carried in a special stream of transport packets with PID=0. The PAT in turn indicates for PROG1, PROG3 etc., which stream carries a programme mapping table PMT, which lists completely the different PID values relating to the single programme, and describes the content of each one (video, audio, alternative language audio, etc.). These tables and other data for control purposes are referred to herein as system information.

To reproduce or record a given programme (PROG1) from the transport stream, the payload DAT-0 to DAT-N of successive transport packets having that PID is concatenated into a stream, and this stream carries packetised elementary stream packets PES-PKT, which are further defined in the MPEG-2 specification. Each PES packet begins with a distinctive packet start code prefix PSCP. Next in the PES packet header is a stream identifier SID which identifies the type of elementary stream (for example video, audio, padding stream or private stream). PES packets do not have a fixed length unless specified in a particular application, and a PES packet length field LEN specifies the number of bytes in the PES packet. Various control and flag fields C&F then follow, including for example a data alignment indicator DAI and a header length field HLEN. Various optional fields are then present within the header HDAT, depending on the value of associated flags in the C&F field for example, a presentation time stamp PTS may be present specifying the time with reference to a system clock at which a "presentation unit" picture, audio frame etc.) beginning in the present PES packet is due to be presented. In certain cases, presentation units are decoded in a different order from their presentation order, in which case a decoding time stamp DTS may also be present.

The payload PY-0 to PY-N of successive PES packets having the same SID forms a continuous elementary stream of data shown schematically at ES in FIG. 2. In the case of a video elementary stream ES-VIDEO, various picture sequences of clips SEQ are present, each including at its start a sequence header SEQH. Various parameters of the decoder including quantisation matrices, buffer sizes and the like are specified in the sequence header. Accordingly, correct playback of the video stream can only be achieved by starting the decoder at the location of a sequence header. Within the data for each sequence are one or more "access units" of the video data, each corresponding to a picture (field or frame depending on the application). Each picture is preceded by a picture start code PSC. A group of pictures GOP may be preceded by a group start code GSC, all following a particular sequence header SEQH.

As is well known, pictures in MPEG-2 and other modern digital formats are encoded by reference to one another so as to reduce temporal redundancy. Motion compensation provides an estimate of the content of one picture from the content already decoded for a neighbouring picture or pictures. Therefore a group of pictures GOP may comprise: an intra-coded "I" frame, which is coded without reference to other pictures; "P" (predictive) coded pictures which are coded using motion vectors based on a preceding I frame; and bidirectional predicted "B" pictures, which are encoded by prediction from I and/or P frames before and after them in sequence. The amount of data required for a B picture is less than that required for a P picture, which in turn is less than that required for an I picture. On the other hand, since the P and B pictures are encoded only with reference to other pictures, it is only the I pictures which provide an actual entry point for starting playback of a given sequence. Furthermore, it will be noted that the GOP data, the I and P pictures are encoded before the corresponding B pictures, and then re-ordered after decoding so as to achieve the correct presentation order. Accordingly, B and P pictures are examples where the presentation time stamp PTS and decoding time stamp DTS may differ.

Finally in FIG. 2 there is shown a representation of an audio elementary stream ES-AUDIO. This comprises simple frames of data FRM with frame start codes. Various audio formats are permitted, varying in terms of sample rate (32 kHz, 48 kHz etc.) and also data rate (for example 32 kbits per second, or variable). These and other properties of the audio and video streams are encoded in the programme specific information PSI and in the PES Packet Headers Audio frames and video pictures having the same presentation time stamp PTS are those which are to be presented simultaneously at the output of the decoder. On the other hand, there is great freedom in the scheduling of packets of data from the different elementary streams, such that audio and video access units having the same PTS value can arrive in the transport stream TS up to one second apart.

Program Stream (PS) Format

Figure 3:
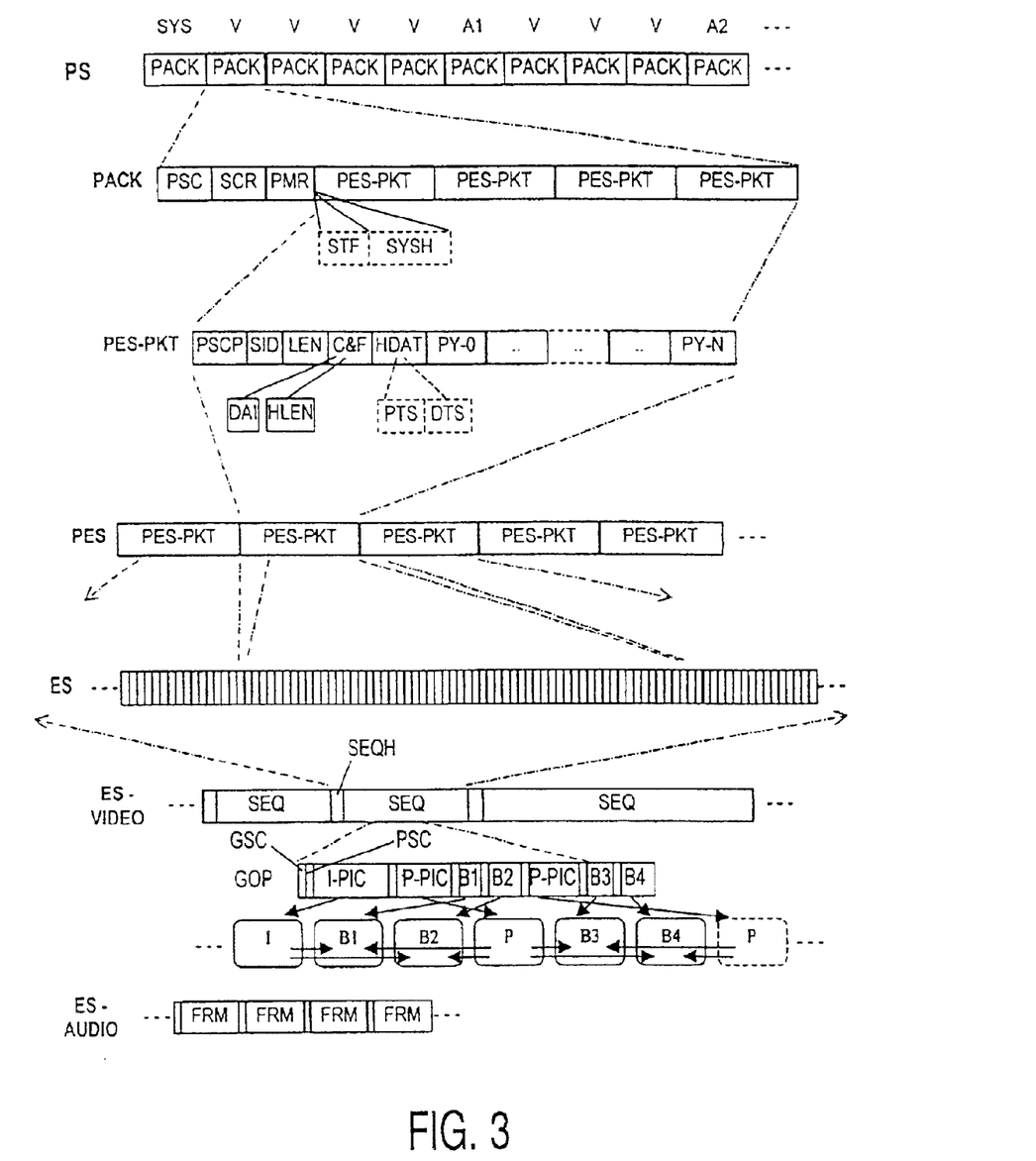
FIG. 3 illustrates the format of data in a program stream format.

FIG. 3 illustrates the other major format type specified for MPEG-2 signals, the program stream (PS). Shown at the top of the Figure, PS conveys the same elementary streams ES-VIDEO and ES-AUDIO as the transport stream illustrated in FIG. 2, and again in the form of PES packets PES-PKT. The program stream is not so finely divided and packetised as TS, and generally carries only the streams required for a single presentation. Entire PES packets PES-PKT are packed in groups of one or more into program stream packs PACK with a basic header comprising a distinctive pack start code PSC, a system clock reference time stamp SCR and a indication PMR of the programme_mux_rate, that is the bit rate a which the program stream PS is intended to be presented to a decoder. A typical programme_mux_rate, for example in the well-known optical disc video system specification, is 10.08 Mbits/s. Optionally, a program stream pack includes stuffing STF and a system header SYSH. As illustrated at the top in FIG. 3, before any video packs V or audio stream packs A1, A2 etc. are transmitted, the program stream begins with an extensive system header, specifying various parameters of the coding and the decoders, a directory of sequence headers and their positions for example on a disc or other storage medium carrying the program stream, in order for the decoder to be set up properly for the decoding of a specific programme. Since there is no transport packet structure with PID codes, the stream identifier SID in the PES packets of the program stream specifies the type of elementary stream carried in the given PES packet, and also if necessary which one of several streams of that type (audio 1, audio 2 etc.) is carried, so that the correct ones may be found and presented to the decoder. The system information in the system header SYSH provides further description.

Applications such as the well-known optical disc video system specify that each pack in the program stream carries only PES packets of one program stream, and indeed typically a single PES packet is carried per pack. In the case of storage on an optical disc or similar recording medium, each PES pack generally corresponds to one retrieval unit or "sector" of the disc filing structure. In general, MPEG-2 standard allows different types and numbers of PES packet to be mixed within each pack, and the pack size may be permitted to vary in other applications.

System Target Decoders

In order to ensure that buffering and other aspects of a real decoder are able to decode each type of stream without breaks in the presented audio-visual programme, the MPEG-2 standard specifies a transport stream "system target decoder" (T-STD) model and a program stream system target decoder (P-STD) model. Broadly, each system target decoder is a model of a hypothetical real decoder having means for de-multiplexing the different elementary streams of the TS or PS format, having decoders for each of the audio, video and system control types of data, and having buffers between the incoming stream and the decoder for holding data of each energy stream between its arrival from a data channel and its actual time of decoding and presentation.

T-STD and P-STD are both similar in general form, as explained more fully in the MPEG-2 specification. However, differences between the T-STD and the P-STD mean that, in general, a transport stream cannot be mapped directly to a program stream without re-scheduling at least at the level of PES packets, and similarly for conversion from PS to TS format. As one example, the audio decoder in TS format has a smaller buffer than in the P-STD. As another example, each main buffer in the T-STD is preceded by a transport buffer which acts to smooth the rather "bursty" data in the transport stream itself. While data for a given stream may arrive in a burst of several transport packets at a peak rate of 40 megabits per second, the average rate of such a stream, when taking into account the entire transport stream multiplex, is far lower. A "leak rate" is defined for the transport buffer so as to throttle the incoming data to a rate of 2 megabits per second, assuming that there is data to be passed into the main buffer.

Conversion from Transport Stream to Program Stream

Figure 4:
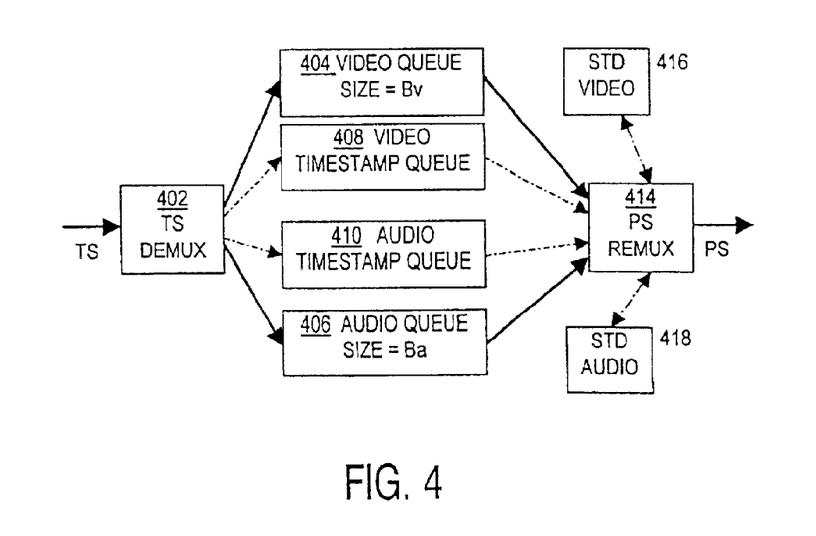
FIG. 4 shows the key data paths and functional blocks in converting a TS format signal to PS format, in accordance with an embodiment of the invention.

FIG. 4 illustrates the process of transmultiplexing by the recorder 104 in the example application of FIG. 1. A DVB standard MPEG-2 Transport Stream received via the digital interface from the a produced by the digital TV decoder 102 is converted to the well-known optical disc video system Program Stream format recorded on disc 106.

Reasons for Transmultiplexing

Certain existing and proposed disc-based formats use a Program Stream disc format. The formats are a sub-set of the possible Program Stream formats that MPEG-2 enables. All use a constrained packetisation structure, in which packs contain only one data type, and have one pack per disc sector. The frequency of I-pictures is defined and there are specific requirements for the alignment of particular data elements. The reason for these constraints is to simplify as far as possible the multiplexing and playback engines, to make trick modes (fast forward and fast reverse picture search for example) and random access simpler to implement and have a defined performance. WO-A-99/20045 discloses one form of additional information designed to make random access and trick play easier in digital video recordings.

In contrast, DVB and similar broadcast formats (ATV, ATSC, B4SB etc.) are all based on Transport Stream and do very little to sub-set the range of possibilities that MPEG allows. In general they add capabilities to the MPEG standard by defining extra data formats for System Information. Each of them is slightly different from the others. Normally a single Transport Stream carries many individual programs. A single Program Stream normally carries just one program.

It would simplify recording products if we limit the number of different disc formats to, ideally, just one, and to convert all input signals to this format. In this way we minimise the amount of player software and hardware, and make it easier to guarantee to end users that all signals can be treated uniformly (e.g. combined, edited, played back in all modes etc.) no matter what their origin. For this reason, there is a desire for conversion from TS to PS formats without loss of quality, and without excessive requirements as to processing effort and storage space.

For the illustration of a practical example, consider recording from a DVB broadcast to a hypothetical DVR recording device. "VBV" indicates the size of the video buffer verifier defined in the MPEG-2 specifications.

TABLE 1

DVB transport stream parameters

| Parameter | Size | Notes |
|---|---|---|
| VBV for MP @ ML | 229376 bytes (1835008 bits) | Same for all MPEG-2 applications |
| STD Video buffer size | VBV size +2500 +7500 | PES headers enter the buffer in addition to elementary data |
| Transport rate | 40 Mbit/s | |
| Video rate | 18 Mbits/s (1.2 x 15 Mbits/s) | Typically much less than this (4–6 Mbits/s) |
| STD Audio buffer size | 3584 bytes | |
| Audio rate | up to 384 kbits/s | MPEG-1 stereo |

TABLE 2

DVR Program stream parameters

| Parameter | Size | Notes |
|---|---|---|
| VBV for MP @ ML | 229376 bytes (1835008 bits) | Same for all MPEG-2 applications |
| STD Video buffer size | VBV size +2500 +7500 | Only elementary data enters the buffer |
| program_mux_rate | 10 Mbit/s | |
| Video rate | 10 Mbits/s | Typically much less than this (e.g 6 Mbits/s) |
| STD Audio buffer size | 3584 bytes | |
| Audio rate | up to 384 kbits/s | MPEG-1 stereo - other formats supported (e.g.LPCM) |

Transmultiplexing Apparatus & Method

FIG. 4 shows the basic data structures and key processes for transmultiplexing TS to PS in the present embodiment. input data stream TS is shown at the left, with output stream PS at right.

The digital video recorder 106 of FIG. 1 includes a TS demultiplexer 402, a set of buffers 404–410, and a PS remultiplexer 412. The buffers 404 and 406 are FIFO (first-in first-out) queues for video and audio payload data respectively. The sizes of the queue buffers are Bv for video and Ba for audio. The buffers 408 and 410 are timestamp queues for the video and audio streams respectively. The remultiplexer 412 maintains a system target decoder model STD, including video STD 416 and audio STD 418. Transmultiplexers will differ on how they handle the scheduling problem and how much intermediate buffering they need.

While the key functional components and processes of the transmultiplexer are shown and described as separate blocks, it will be appreciated that the various buffers and processes described herein may be implemented in a general purpose processor and a shared memory, used also for other purposes of the player 104 or other apparatus. Equally, specialised digital signal processors and/or dedicated hardware can be used at appropriate points, according to normal design considerations.

This description assumes that the Transport Stream either is available at the input to the recording device in the clear (not scrambled), or can be descrambled within the recording device. When this is not the case, a separate mode for recording and playing real-time bit-streams to and from a set-top box will be necessary. Because the Transport Stream formats are very generic it will nearly always be necessary to regenerate the packets and, to some extent reschedule their delivery in the output stream.

TS Demultiplexer 402

The actions of Demultiplexer 402 are as follows (MPEG terminology as explained above with reference to FIGS. 2 & 3):

Read the transport stream—packets are arriving at a constant rate (or piecewise constant in the case of a "partial-TS" carrying essentially one programme.

Lock onto the Transport Packet structure—find and check sync words.

Parse the stream to find packets containing sections that make the Program Association Table (PAT) (in PID==0).

From the PAT find the set of PIDs that contain the Program Map Tables (PMTs) for each program.

Build the PMTs from the relevant transport packets.

Based on user input, the PMTs are checked find which PIDs contain the elementary streams to be recorded and which one contains the PCR (program clock reference) for this program.

Filter the Transport stream to route the transport packets with the specified PIDs to the remultiplex queue, and discard the rest.

Strip the PES headers.

Parse the elementary streams to find Sequence start codes and Picture start codes (Video) and Frame start codes (Audio).

Knowing the start codes, picture types and locations generate time stamps PTS/DTS for each frame, by interpolation where necessary.

Process time stamps to handle/eliminate discontinuities in the timebase (restamp them).

Generate PCRs for each access unit's start.

Send elementary data to appropriate queue 404/406.

Send timestamp data FIFO to the corresponding time stamp queue 408/410, including a pointer to the elementary data which corresponds.

Note that the PES packet structure has been lost, so that the queue contents correspond essentially to the continuous elementary streams ES of FIGS. 2 & 3.

PS Remultiplexer 414

Remultiplexer 414 performs the following actions repeatedly to generate the output stream in PS format:

Schedule a pack (audio or video) for inclusion next in the output stream. Several strategies are possible for this as explained below, with consequences for the size and cost of the apparatus. The decoder models 416 & 418 are updated continually during this process.

Build a pack header (see FIG. 3).

Build a PES header, including inserting a time stamp from the appropriate timestamp queue 408/410. Alignment rules are enforced at this point.

Read data from the appropriate FIFO queue 404/406 and build packet payload data.

Write the pack to the output channel (storage medium in this case).

The above two processes can be implemented in a mixture of hardware and programming, whether of general purpose microprocessors or digital signal processor chips (DSP). Using a single processor in one embodiment, the transmultiplexer shown in FIG. 4 runs as two processes: one (402) does Transport Stream demultiplexing, writing elementary stream data and time stamps to output queues; the other (414) reads these queues and remultiplexes the data as Program Stream.

Various aspects of the implementation will now be described in more detail.

System Information Parsing and PID Filtering

MPEG-2 Transport Stream Program Specific Information (PSI) and the DVB implementation of it (SI) are rather complex to parse. Any recorder that makes a selection from a multiplex in order to record a single program rather than recording the entire multiplex will have to implement this complexity irrespective of the format (PS or TS) that is stored on disc.

Each transport packet has a PID number for the stream that it belongs to. On first receiving the input stream TS, the demultiplexer 402 first has to build the Program Association Table (PAT) by filtering and parsing the PSI sections in PID number 0. The PAT gives a list of programme numbers and the PID number that contains the Program Map Table (PMT) for that programme. After acquiring the PAT, on receipt of each transport packet its PID number must be checked to see if it is the one specified in the PAT. Either the PID of the packet indicates that it belongs to programme selected in which case it should be processed, or it should be discarded.

If it is a PMT packet, it should be parsed and the PMT sections should be constructed to give the PMT for the programme. The PMT gives a list of PID numbers and stream type for each elementary stream (Audio, Video, Overlay Graphics etc.) that make up the programme to be recorded. In addition it indicates which PID packet carries the PCR (program clock reference) for this program. This indirect structure means that the PID filtering process involves checking the PID value of every transport packet against the PAT. Additional information in the form of descriptors can also be inserted into the PMT, for example to describe each Elementary Stream.

The PMT and PAT may be updated in an arbitrary way at arbitrary times in the course of the input stream.

Time-Stamp Discontinuities

The Transport Stream specification allows for there to be a discontinuity in the time-base (PCR) of a programme. Different programmes in the transport stream generally each have their own PCRs. In converting this to PS it is necessary to restamp the PTS/DTS and SCRs. It is a good idea to re-base the PTS/DTS values to start from an SCR of zero to avoid "wrap-around" issues. Although machines can be made able to accommodate wrap-around without problems, some formats require SCR to start from zero.

Transport Stream PES Packet Structures

The MPEG-2 Transport Stream specification puts no requirements on the PES packet structure. It is not required to be a fixed size, nor is it required to be aligned to video or audio frames. Many different structures are used in practice. The Program Stream, in contrast, uses the PES packet as the interleave unit. A transmultiplexer therefore has to be prepared to depacketise and repacketise the elementary streams. The well-known optical disc video system uses a Pack size of 2048 bytes, with packets fitting inside this.

TS format does not guarantee to have a PES packet for every frame/field. Nor is it specified, if there is a PES packet, that it has PTS/DTS. Therefore the transport parser has to parse the elementary streams (audio and video) to find the Sequence, Picture, and Frame start codes. Audio may be any bit rate or variable. Therefore a full parser for audio frames is needed.

The video parser needs further to extract the picture type, repeat first field flag etc., and to be aware of the full content of MPEG-2 Video Annex C because nearly all MPEG-2 Video formats are permitted. Note that this is more than a multiplexer in a self recording product needs to do. In a self recording product the encoder can use a known sub-set of the entire MPEG specification and so simplify the multiplexing.

Maintaining A-V Sync Through the Process

It is important to maintain the synchronisation of audio and video through the process. In the transport streams, frames that are to be presented synchronously are identified by their time-stamps (PTS/DTS). Synchronous audio and video frames are typically far apart (skewed) in the bitstream. On first reading the transport stream it takes some time to synchronise the parsing and extract reliable information. As mentioned already, it is necessary to:
1. Find and check the transport sync word (SYNC in FIG. 2, TS)
2. Find the PAT and PMTs
3. Start parsing the Elementary PIDs
4. Video: wait for a sequence start code and I-picture
5. Audio: acquire frame sync (this may take several frames as the frame start code is not necessarily unique in the bit stream)

Only after these steps is the demultiplexer 402 ready to output elementary streams. The result is that the first audio frame to become available for recording is not synchronous with the first video frame to become available for recording. The remultiplex and recording process therefore needs to know a time-stamp (PTS) for each frame so that they can be re-aligned. In principle, this timing information can be communicated in several different ways. Using the PES packet header would be convenient. Unfortunately the Transport Stream offers no guarantees that the frame at which one can start recording has a time stamp in the PES packet, and in any case we need to re-packetise the stream, as noted above.

The solution chosen in this embodiment is a separate time stamp queue for each Elementary stream. The time stamp queue records, for every frame in the elementary stream queue, the PTS/DTS, a sampled value of the PCR projected to the delivery time of the appropriate byte of the frame, and a pointer to the first byte of the frame in the elementary stream queue. The timebase is re-based to zero by subtracting a constant from all PTS, DTS and PCR/SCR values. This constant is adjusted to eliminate discontinuities in the broadcast time-base.

It is necessary to parse the elementary streams. In the case of audio we need to identify reliably every frame start (we do not know in advance the bit-rate, sampling rate and hence frame size, which must be calculated dynamically). In the case of video we need to find the start of every picture (field or frame), the picture coding type, the picture structure (field or frame), the values of repeat first field and top field first flags, and hence whether this is a first or second field. This information is needed to calculate the correct values of PTS/DTS according the VBV model of Annex C in 13818-2.

Even if a Transport Stream were to be recorded directly without conversion to a Program Stream, nearly all of this parsing functionality would be required. We need to find the start and end of pictures to generate indexing information to enable FF/FR trick modes and random access (see for example WO-A-99/20045 mentioned above). We would, optionally, need to parse the audio to find the synchronous audio frames. It is likely that playback entry points (I-pictures with Sequence/GOP header) would require to be time-stamped in the recording format. The broadcast format does not guarantee that these frames have time-stamps—they would need to be found and have time-stamps inserted.

Packet Scheduling in the Program Stream—SCR Calculation

Scheduling packets to carry the elementary streams is the hardest problem in the transmultiplexer. Several different strategies are possible, each with a different trade-off of memory usage, complexity, and packing efficiency. The only requirement is that the resulting stream complies to the Program Stream STD model.

The input bit-rates of the elementary streams being recorded must be low enough that they can be stored on the disc (the sum of the elementary stream bit rates must be less than program_mux_rate).

One approach to be considered is to store elementary streams with a buffer size at least as big as the STD buffer (in the case of video 230 k). The program stream remultiplexer can then run a normal scheduling algorithm in which PS STD models are maintained for each stream taking packets from elementary streams as the algorithm sees fit. In this case the SCR values, and packet scheduling policy are determined independently of the PCR values in the TS. This will always be possible to do, but it needs significantly bigger intermediate queues (about 250 k for video), and a great deal of processing effort. It also needs a relatively complex scheduling algorithm—though basically one that is needed for a normal PS multiplexer.

If there is a requirement to transcode the video (to control the bit-rate for example) as well as to transmultiplex it, then the complete rescheduling algorithm may be appropriate. The memory would be needed in any case for transcoding. Otherwise, however, the usage of processing capacity and storage makes such an apparatus relatively expensive, and detracts from its ability to perform other tasks in parallel.

The aim of the approach chosen in the present invention is to follow the schedule of the original Transport Stream as closely as possible when generating the output stream PS. In this way the data is packed into PES packets in the program stream as soon as possible after it is extracted from TS packets. This minimises the delay of data in the remultiplexer and hence the amount of buffering needed in the elementary stream queues. The implementation of this principle will not be explained further.

The transport stream packet payload is 184 bytes (or less if there is an adaptation header AF—FIG. 2). A Transport Stream can be scheduled at this granularity. However, the normal size of the payload of a program stream in the well-known optical disc video system or the like is about 2030 bytes (FIG. 3). It would be possible, but very inefficient, to insert program stream PES packets of 184 bytes into each Pack. It is better to accumulate a number of TS packets until a larger PS packet can be made. Ideally we would make Program Stream packets that completely fill a sector. In the case of video streams this is possible.

However in the case of audio we have to choose a different approach. An MPEG-1 audio frame varies in size from 192 bytes (64 kbits/s 48 kHz) up to 1728 bytes (384 kbits/s 32 Hz). The last byte of each audio frame can be delivered to the decoder by the input stream TS "just-in-time", in which case frames have to be multiplexed as soon as they are ready. Therefore we cannot wait until we have a received a full sector of audio data before inserting it into the Transport Stream.

MPEG-2 Systems specification defines the "leak-rate" from the transport buffer for Audio to be 2 Mbits/s. The delivery time for the 184 bytes of a full transport packet at 2 Mbits/s is 0.736 ms. The total bandwidth program_mux_rate of the hypothetical DVR Program Stream is 10 Mbits/s (Table 2). In the "worst case scenario", a maximum size frame (1728 bytes) is scheduled for presentation immediately after the last data byte of the frame in the transport stream is available for presentation in the T-STD. The time to send the full frame of 1728 bytes at 10 Mbits/s is 1.4 ms.

The apparatus of the present embodiment permits the remultiplexer 412 to accumulate the audio data to make a full frame before multiplexing it. To achieve this without violating the specifications, some extra delay (about 1.4 ms or 1750 bytes) is added to all the streams to compensate for the possibility of having to avoid delivering the audio frame data late. This disturbance in the scheduling algorithm will lead to an increase of about 2 k in the VBV buffer fullness. In extreme cases, in principle, this could lead to video STD buffer overflow. In practice, however, this will not be a real problem, because: (i) there has to be some slack in the multiplexing algorithm, (ii) the STD buffer sizes are slightly different between the input and output STDs (T-STD/P-STD), and (iii) in the PS STD buffer the PES headers are not counted.

The SCR values in the program stream are determined by the projected PCR values for the delivery time of each frame in the elementary streams. This algorithm requires a queue buffer of about twice the sector size for each elementary stream (about 4 k–5 k bytes). Simulation has confirmed that this algorithm is workable with a 10 k queue buffer size, which compares very favourably with the 250 k or so required for a complete multiplex from scratch.

What is claimed is:

1. A method of converting a data stream received in a specified Transport Stream (TS) format into an output data stream in a specified Program Stream (PS) format, the TS format being one in which at least first and second packetised elementary streams of encoded information relating to a desired programme have been further packetised into TS packets and multiplexed together with further streams relating to different programmes, the PS format being one in which the first and second elementary streams and optionally others relating generally to a selected programme are packetised and their packets interleaved to form a multiplexed stream of PS packs, each PS pack including a pack header and one or more whole packets of the packetised elementary streams, wherein said method comprises:

(a) extracting from the received data stream program mapping information identifying a current stream index for each of the first and second elementary streams;

(b) filtering data of the received data stream to extract packets carrying the desired elementary streams;

(c) parsing the first and second elementary streams in accordance with packet header information to identify a sequence of presentation units within the payload of each desired elementary stream;

(d) writing the presentation units of each stream in sequence into first and second payload queues respectively prior to re-multiplexing;

(e) determining, in accordance with a synchronous relationship between the elementary streams and with a PS target decoder model and PS stream constraints, a valid PS schedule for re-multiplexing payload data from the first and second payload queues into a series of PS packs; and (f) in accordance with the determined PS schedule, retrieving said payload data from each queue, inserting packet headers so as to re-packetise each elementary stream, generating PS pack headers and multiplexing the packets of the first and second elementary streams into a series of PS packs so as to generate said output data stream;

wherein the PS schedule determined in step (e) is dependent on the scheduling of presentation units within the received TS format signal.

2. The method as claimed in claim 1 further comprising:

(g) extracting from the received data stream timing references associated with specific points in the packetised elementary streams and calculating a time stamp value for each presentation unit in each elementary stream, including interpolated time stamp values for those presentation units not accompanied by a timing reference in the received TS format data stream;

(h) writing the time stamp values into first and second time stamp queues so as to correspond with the respective presentation units entered in the first and second payload queues; and (i) retrieving each time stamp value from the queue when retrieving the corresponding payload data.

3. The method as claimed in claim 1 wherein a presentation timing reference value is included in the PS pack for any new presentation unit starting within the pack, said presentation timing being obtained by calculation from TS delivery timing and presentation timing reference fields accompanying certain presentation units within the received data stream, and by interpolation for presentation units not accompanied by a delivery timing reference in the received TS format data stream.

4. The method as claimed in claim 3 wherein a data rate of the first elementary stream is substantially greater than that of the second elementary stream.

5. The method as claimed in claim 3 wherein in step (e) payload data from plural TS packets of the first elementary stream is generally accumulated to fill substantially a complete PS pack before scheduling any of said data in the PS schedule.

6. The method as claimed in claim 5 wherein in step (e) payload data corresponding to one complete presentation unit of the second elementary stream will be scheduled without waiting for data of the elementary stream to fill substantially a complete PS pack.

7. The method as claimed in claim 6 wherein in step (e) the data of the first elementary stream is delayed in the first payload queue by a delay at least equal to a minimum time required to receive one complete presentation unit of the second elementary stream, while a presentation unit of the second elementary stream may be scheduled immediately it is completely received.

8. The method as claimed in claim 7 wherein the different presentation unit data sizes and/or different data delivery rates are valid within the TS format for the second elementary stream, and wherein said minimum time is fixed at least equal to a time required to receive one complete presentation unit of a largest size at a lowest rate.

9. The method as claimed in claim 1 wherein the PS format specifies a minimum buffer size for holding the first elementary stream payload in a compatible decoder during decoding, and wherein the first payload queue has a maximum capacity less than one tenth said minimum buffer size.

10. The method as claimed in claim 1 wherein the PS format specifies a minimum buffer size for holding the first elementary stream payload in a compatible decoder during decoding, and wherein the first payload queue has a maximum capacity less than one twentieth said minimum buffer size.

11. The method as claimed in claim 1 wherein the first payload queue has a maximum capacity between one and a half (1.5) and four (4) times the size of each PS pack.

12. The method as claimed in claim 1 wherein each entry in the time stamp queue records for the corresponding presentation unit a TS format delivery time of the presentation unit within the received data stream and a presentation time for the presentation unit after decoding, and wherein the PS pack containing the same presentation unit includes an indication of a PS format delivery time for the pack and an indication of presentation time for at least one presentation unit within the PS pack.

13. The method as claimed in claim 1 wherein timing reference values included in the PS format output data stream are calculated with reference to a single time base irrespective of changes in time base throughout the received TS format data stream.

14. The method as claimed in claim 1 wherein said PS packs and elementary stream packets are generated so as to align the start of a new presentation unit preferentially with the start of a PS pack irrespective of misalignment between corresponding features in the received TS format data stream.

15. The method as claimed in claim 1 wherein said PS format data stream is generated so as to employ a fixed program mapping irrespective of changes in program mapping signalled and followed in the TS format stream.

16. The method as claimed in claim 1 wherein the presentation units of the first elementary stream comprises encoded video pictures and the presentation units of the second elementary stream comprises encoded audio frames.

17. The method as claimed in claim 1 wherein said TS format is compliant with the MPEG-2 Transport Stream specification, while said PS format is compliant with the MPEG-2 Program Stream specification, both as defined in ITU-T Recommendation H.222.0 and ISO/IEC 13818-1.

18. The method of recording an audio-visual programme wherein a programme to be recorded is selected from among a plurality of programmes conveyed in a transport stream (TS) format, converted to a program stream (PS) format by a method as claimed in claim 1, and then recorded on a recording medium for subsequent retrieval and decoding.

19. An apparatus comprising means for receiving an input data stream in a first format wherein at least two elementary streams of data are multiplexed and means for converting the data to a second format to generate an output stream, said converting means comprising means specifically adapted to implement a method as claimed in claim 1.

20. The apparatus as claimed in claim 19, the apparatus comprising one of: a stand-alone decoder apparatus for digital video programmes, a presentation apparatus having a display for video programmes, and a reproducing apparatus for playing and optionally also for recording digital video programmes.

* * * * *